Jan. 29, 1957  E. A. RASKY  2,779,226
MOTOR DRIVEN REPEAT MECHANISMS FOR PIANO
Filed Jan. 27, 1953  8 Sheets-Sheet 1
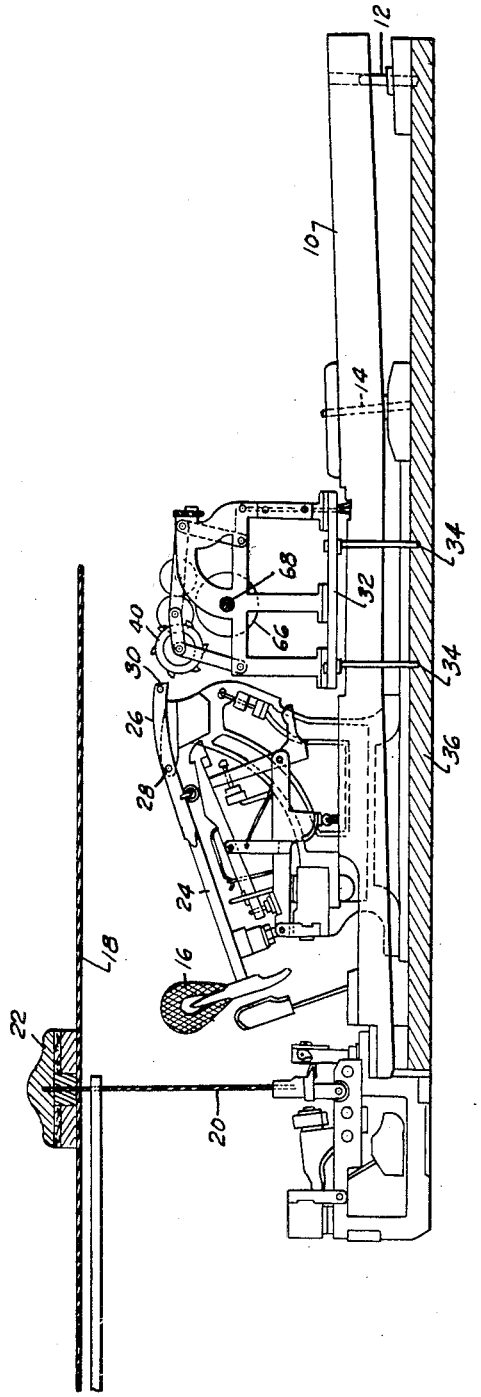
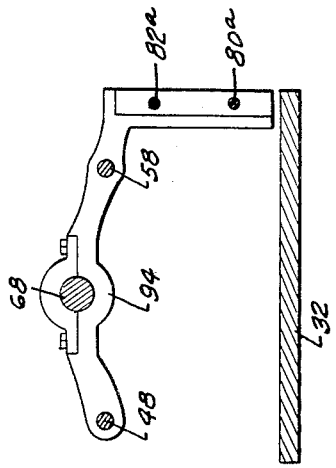
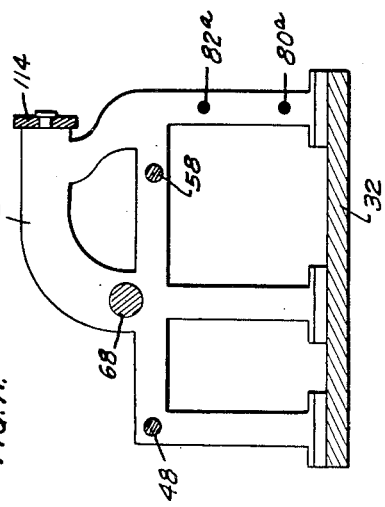
INVENTOR.
EDWARD A. RASKY.
BY
Harry H. Hitzeman
ATTORNEY.

Jan. 29, 1957  E. A. RASKY  2,779,226
MOTOR DRIVEN REPEAT MECHANISMS FOR PIANO
Filed Jan. 27, 1953  8 Sheets-Sheet 2
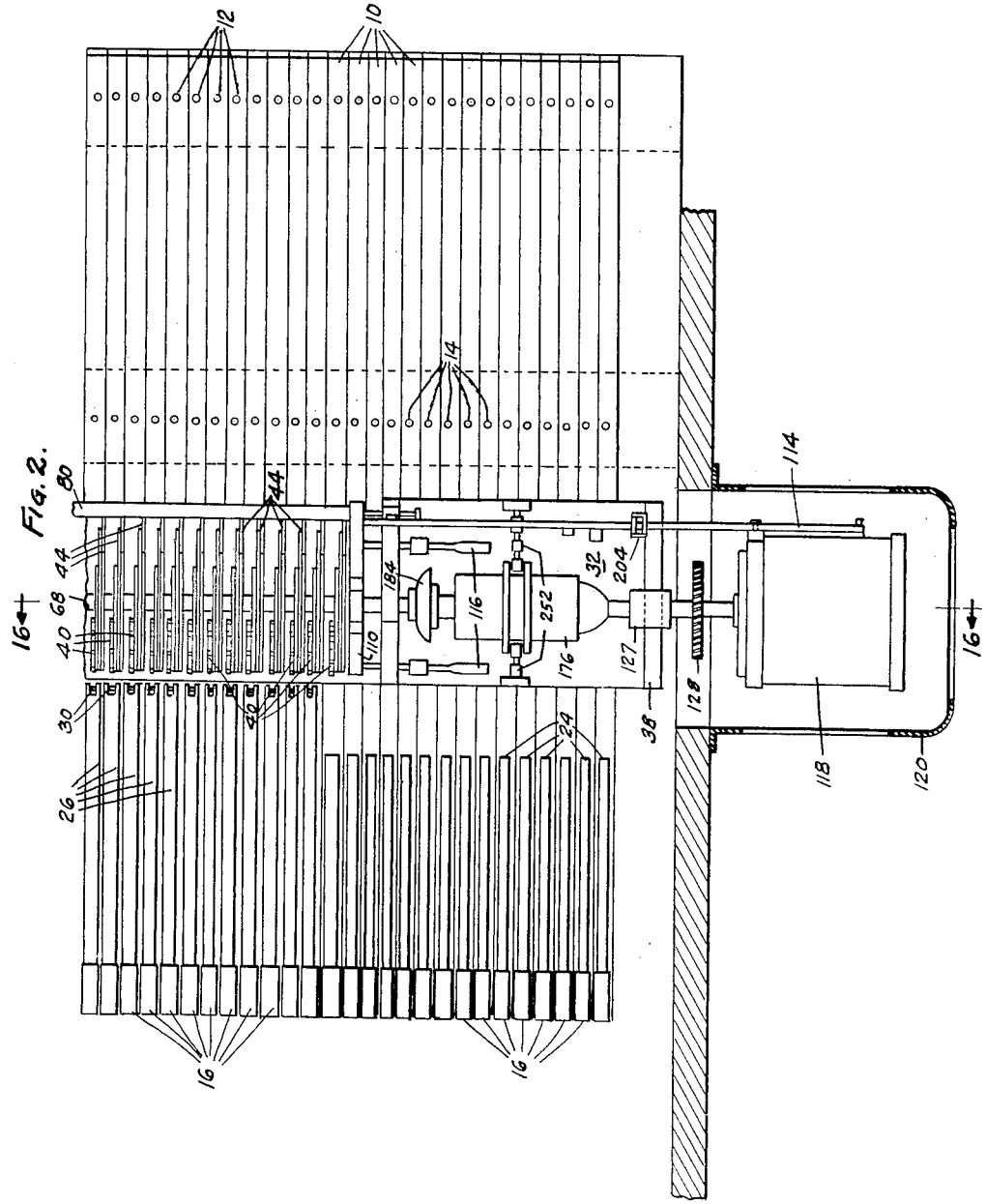
INVENTOR.
EDWARD A. RASKY.
BY
Harry H. Hitzeman
ATTORNEY.

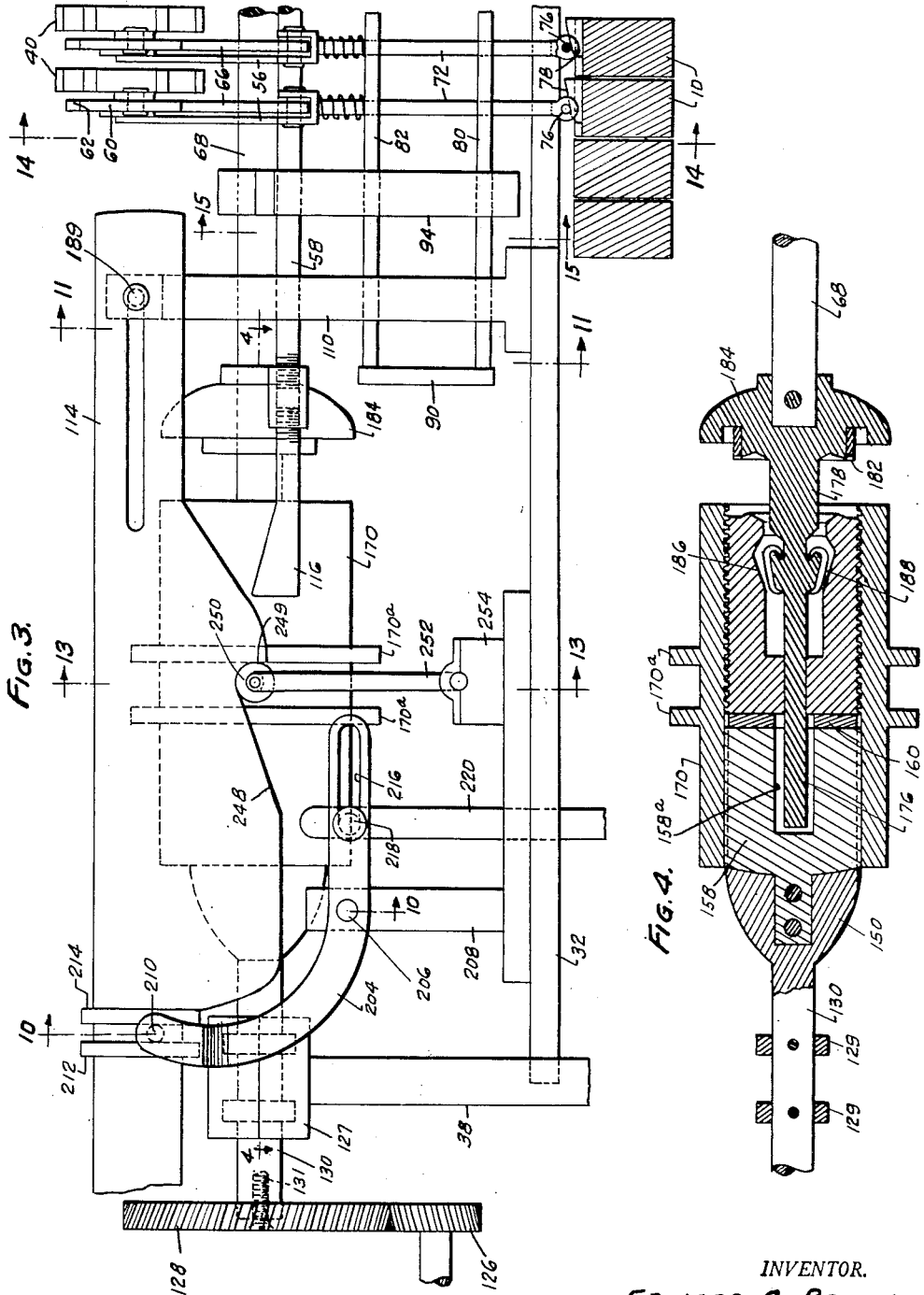

Jan. 29, 1957  E. A. RASKY  2,779,226
MOTOR DRIVEN REPEAT MECHANISMS FOR PIANO
Filed Jan. 27, 1953  8 Sheets-Sheet 4
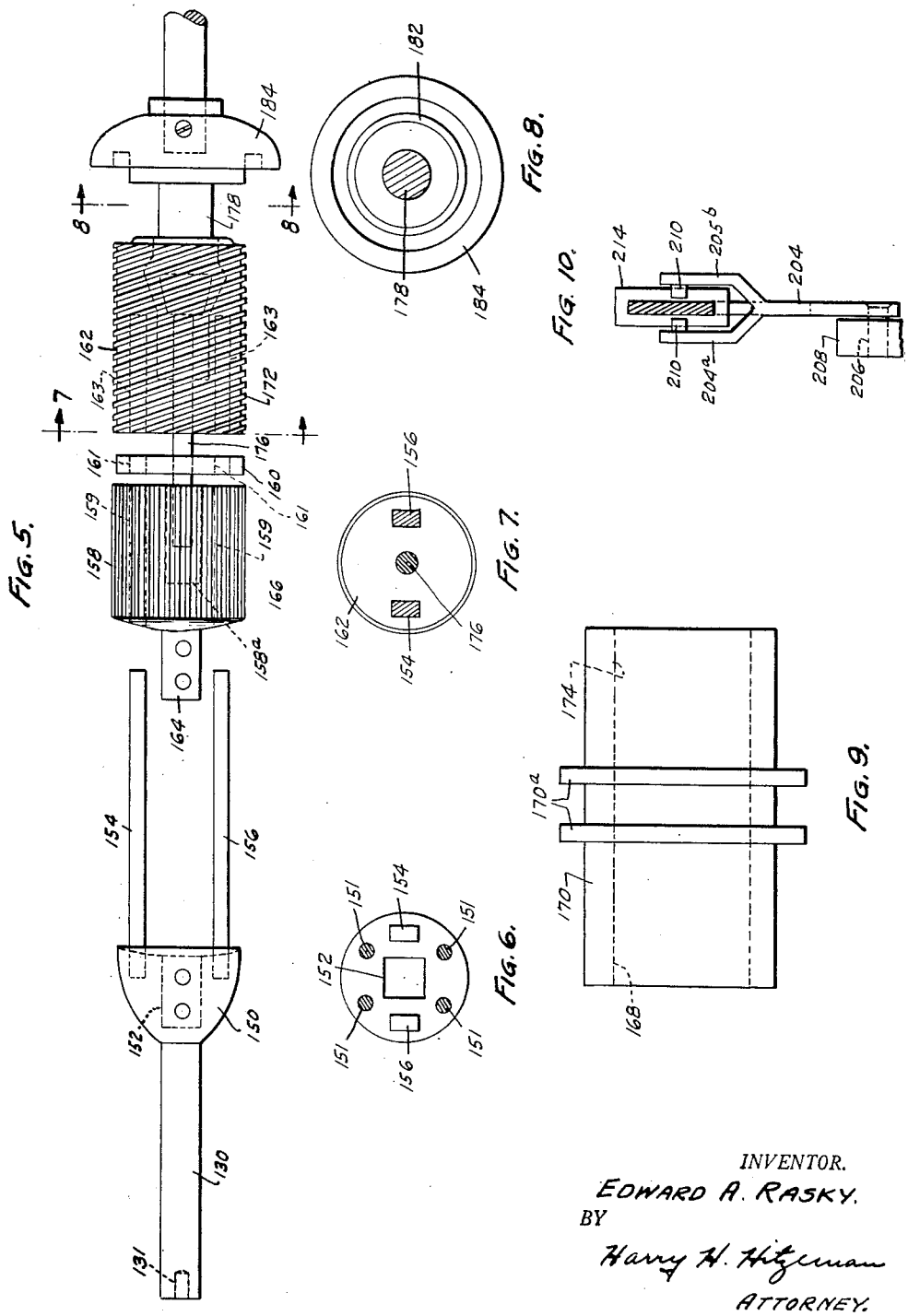
INVENTOR.
EDWARD A. RASKY,
BY
Harry H. Hitzeman
ATTORNEY.

Jan. 29, 1957 E. A. RASKY 2,779,226
MOTOR DRIVEN REPEAT MECHANISMS FOR PIANO
Filed Jan. 27, 1953 8 Sheets-Sheet 5
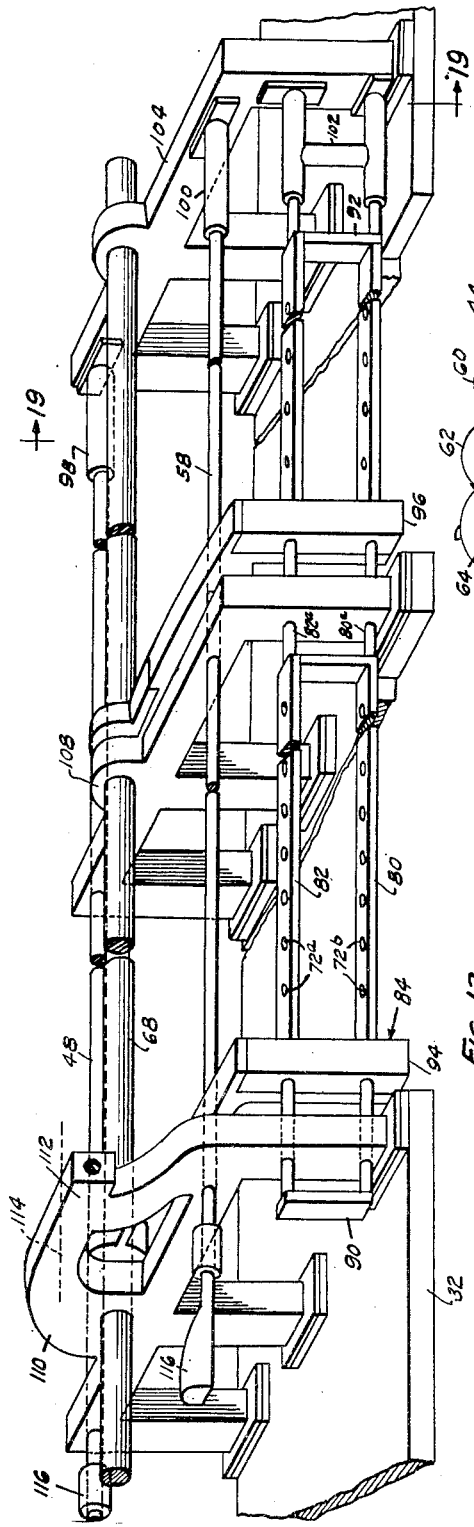
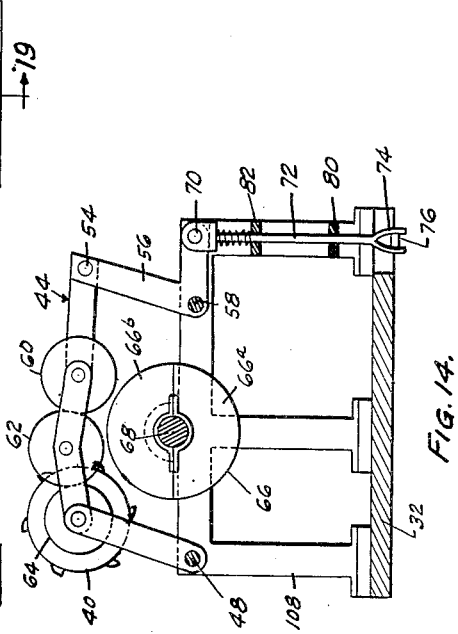
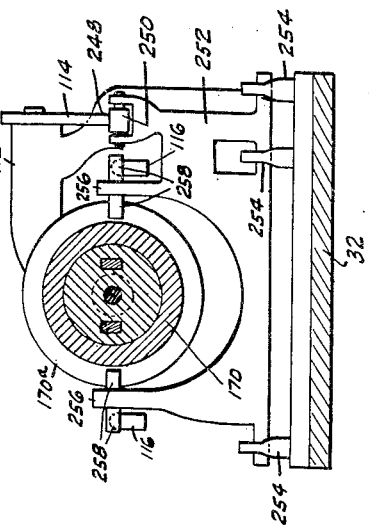
INVENTOR.
EDWARD A. RASKY.
BY
Harry H. Hitzeman
ATTORNEY.

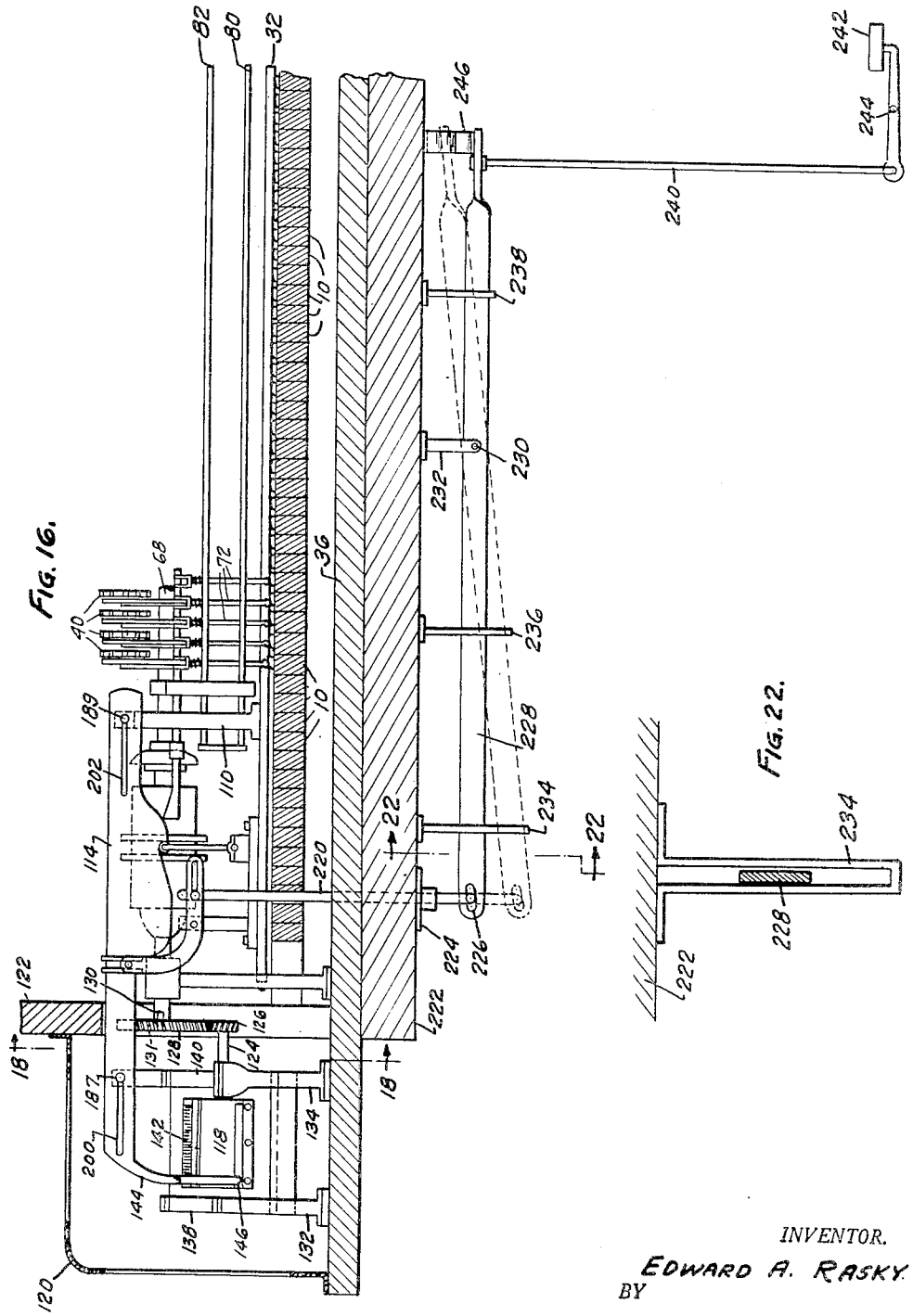

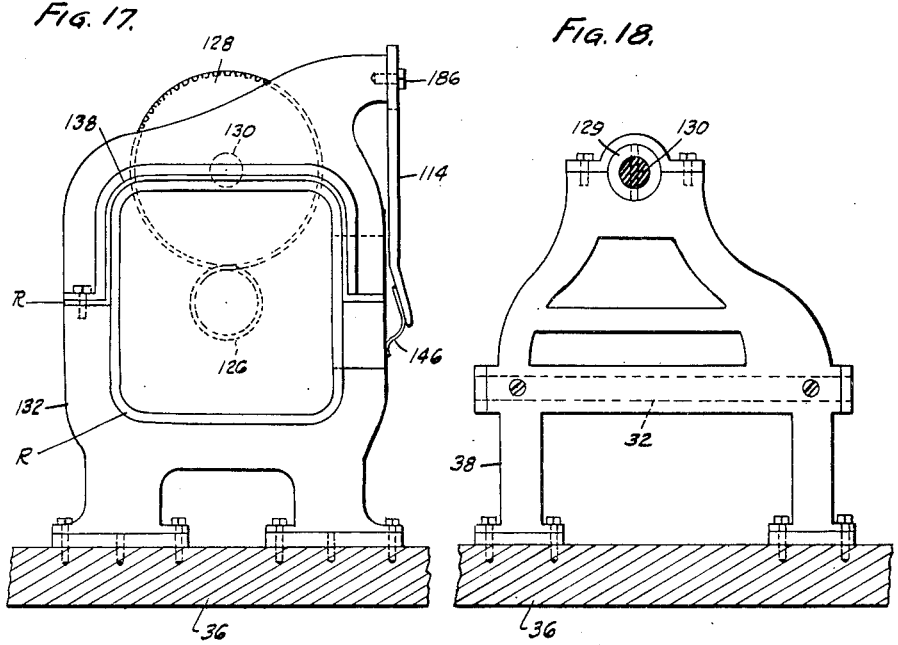

Jan. 29, 1957  E. A. RASKY  2,779,226
MOTOR DRIVEN REPEAT MECHANISMS FOR PIANO
Filed Jan. 27, 1953  8 Sheets-Sheet 8

INVENTOR.
EDWARD A. RASKY.
BY
Harry H. Hitzeman
ATTORNEY.

United States Patent Office 2,779,226
Patented Jan. 29, 1957

2,779,226

MOTOR DRIVEN REPEAT MECHANISMS FOR PIANO

Edward A. Rasky, Chicago, Ill.

Application January 27, 1953, Serial No. 333,440

10 Claims. (Cl. 84—239)

My invention relates to improvements in the construction of pianos.

My invention relates more particularly to the provision of mechanism for providing a continuous and, or, a pliable tone piano action.

The principal object of the present invention is to combine with and incorporate within the piano instrument, an auxiliary fourth-pedal tone apparatus. It is to be incorporated therein in teamed unity with the established hammer action, and is not in any way to hinder or interfere with the free operation of that primary constituent should the performer not choose to utilize it. The tonal characteristics of the piano, as presently familiar, are to remain unchanged when the auxiliary tone apparatus is not used. The contributive purpose of this new medium is to so augment the piano's musical capacity that the performer will be able to prolong indefinitely, increase, slur or even waver any selective note or combination of such notes, subsequent to the keyboard tonal delivery. In other words, after having depressed and while holding a key, or group of keys, the facilities would be tendered him for his retention of control over the tone produced to sustain it and shape it according to his will.

The piano as now endued, although highly melodic, lacks this quality of musical fancy. The tones produced by quick strokes of felt-headed hammers against steel strings are fixed at the instant of contact and carry no other momentum but the fading velocity of the string vibrations. The performer can in no way modify or color them. His means of inducing diversified lyric effects are made available only through the usage of multiple notes. The individual note, however, once having been struck, is unalterably removed from his direction and technical skill. My improved apparatus is provided for the correction of that deficiency and to provide the artist with an enhanced, more fluent instrument for expression of his talent.

A further object of the present invention is to provide means whereby with the provision of a fourth pedal upon the piano, a piano action may be provided which will produce a continuous and undying tone on any string at the will of the player, without in any way interfering with the usual operation of the action of the other piano mechanism or of the music ordinarily produced thereby.

Another object of the invention is to provide means capable of action whenever desired whereby the continuous tone on any string of the piano may be increased or diminished in volume at will.

A further object of my invention is to provide mechanism which is capable of contacting or engaging any given hammer, whether one or more, to effect sustained rapid repetitive actuation of the hammer, systematically timed to produce the simulated effect of a constant, unbroken tone. Progressing from this conditional starting-base, the steady, unfading tone developed is to be made capable of alternate enlargement or diminishment in volume, without breakage in melodic continuity. These blended variations in tonal quantity are effected through commensurate changes in the speed of the hammer reciprocal motions. It can be readily understood that the intensity of a simulated constant tone, produced through rapidly repeated strokes of a hammer upon a string of fixed pitch would necessarily be determined by the rate of repetitive speed, and which greater speed would in itself impart greater force to the repeated strokes. Hence, the faster or slower the stroke, the greater or lesser the volume.

It is necessary therefore, that the mechanism be possessive of such faculties as will, upon the performer's depression and retention of the key, efficiently employ the upflung hammer for that versatile repercussive effort, and without further finger usage being involved. Accordingly, it is to be devised as an automatic self-propelling mechanism, capable of rapidly actuating the hammer with an interchangeable rate of speed, and while doing so, the keys appertaining to those hammers are merely to be held in stationary depression.

This mechanism may properly be confined to but a chosen field of notes, the range selected being the most lyric in tone, and therefore most favorable for volume modulation. It is preferred that the series of keys assigned for this duty be grouped along the center of the keyboard, excluding the very low bass and very high treble. The range embraces four octaves, containing 49 keys running from low or great C (two octaves below middle C) to C–2, (two octaves above middle C). The object underlying this consignment to our purpose of but a portion of the total keyboard range is solely with a view towards moderating the construction of this mechanism and is not meant to limit the scope of the invention, it being understood that all keys may be embraced, if desired.

A further object of the invention is to provide improved means associated with a stringed instrument such as a piano to provide whenever desired and upon certain keys within the melody range a continuous tone by means of a source of power directed or controlled by one of the piano keys or its equivalent, whereby sound producing means may be operated by a single movement of the key, the duration and loudness of the tone being dependent upon the operation of a fourth pedal which utilizes a source of power extraneous to said key for producing a continuous vibration of the string or strings of the piano at the will of the performer, said extraneous source of power operating to maintain the tone continuously at the loudness determined by the player and by means of which, when the tone is being continuously emitted, a general crescendo or diminuendo of the tone may be obtained, or a crescendo or diminuendo of the tone of one or a number of keys that may be continuously sounding may be obtained.

A further object of the invention is to provide in connection with mechanism for providing a continuous tone action, motor driven means for actuating the hammer to secure a continuous tone action, said motor means capable of control by a fourth pedal to increase or diminish the loudness of the tone emitted by the hammer action.

A further object of the invention is to provide an improved combination clutch and shifting means associated with the motor means for actuating the hammer, said combination clutch and shifting means being responsive to sustained, continuous and automatic pressure on the fourth pedal. The clutch faculty thereof would thus enable the motor to maintain an idle run at minimum motion through any length of time at the discretion of the performer and regardless of on and off tonal delivery. Appertaining to the shifting quality, this latter is based on the major object of displacing the auxiliary tone producing elements, when remaining at rest, from direct approach by the keys, and thus insuring the unhindered performance of the normal piano action when used alone.

A further object of the invention is to provide means of the type above described whereby these features may be introduced into pianos of the usual or ordinary type so that the same may optionally be used in connection with the piano or the piano may be used in the ordinary manner whenever desired.

For a more comprehensive understanding of the means by which the results above described are accomplished and the manner in which the same are operated, reference is had to the accompanying drawings, upon which Fig. 1 is a fragmentary cross-sectional view through a portion of a grand piano, the description herein relating solely to a structure adapted for use with grand pianos;

Fig. 2 is a fragmentary plan view of a portion of the piano showing generally the relationship of the mechanism for sustaining a tone to the standard mechanism of the piano;

Fig. 3 is a fragmentary full size view of a portion of the drive and the clutch mechanism for operating the whippen wheel driving shaft and associated mechanism;

Fig. 4 is a plan sectional view through the clutch mechanism showing the same in a non-driving connection;

Fig. 5 is an exploded view showing the separable parts of the clutch mechanism;

Fig. 6 is an end elevational view of the coupling hub shaft;

Fig. 7 is a cross-sectional view showing the clutch hub and associated parts taken generally on the line 7—7 Fig. 5;

Fig. 8 is a cross-sectional view showing the face of the driven clutch or tractor flange, taken generally on the line 8—8 of Fig. 5;

Fig. 9 is an elevational view of the clutch collar;

Fig. 10 is a fragmentary sectional view showing the control rudder operating lever and control rudder, taken generally on the line 10—10 of Fig. 3;

Fig. 11 is a cross-sectional view through the support bracket and the end of the control rudder taken generally on the line 11—11 of Fig. 3;

Fig. 12 is an isometric perspective of the base plate upon which the mechanism, consisting of the trundle carriage, which includes the whippen wheel shaft and associated parts, is mounted directly above the keys of the piano, the view being broken into section to foreshorten the same;

Fig. 13 is a vertical sectional view through the clutch operating fork and clutch mechanism; taken generally on the line 13—13 of Fig. 3;

Fig. 14 is a cross-sectional view of one of the whippen wheels and rocker assembly therefor, taken generally on the line 14—14 of Fig. 3;

Fig. 15 is a similar sectional view of one of the drag yokes which connect the trundle carriage for the shiftable whippen wheel rocker assembly, and is taken generally on the line 15—15 of Fig. 3;

Fig. 16 is a fragmentary cross-sectional view taken generally through the piano housing showing the motor, the drive, the clutch mechanism and the pedally operated lever for causing the fourth pedal action, and is taken generally on the line 16—16 of Fig. 2;

Fig. 17 is an end view of the motor and associated parts looking from the left of Fig. 16;

Fig. 18 is a cross-sectional view showing the support for the drive shaft into the clutch mechanism, taken on line 18—18 of Fig. 16;

Fig. 19 is a cross-sectional view showing the end bracket for supporting the trundle carriage and is taken generally on the line 19—19 of Fig. 12;

Fig. 20 is a fragmentary side elevational view showing the parts shown in Fig. 19; Fig. 22 is a fragmentary sectional view taken on the line 22—22 of Fig. 16.

Figure 21:
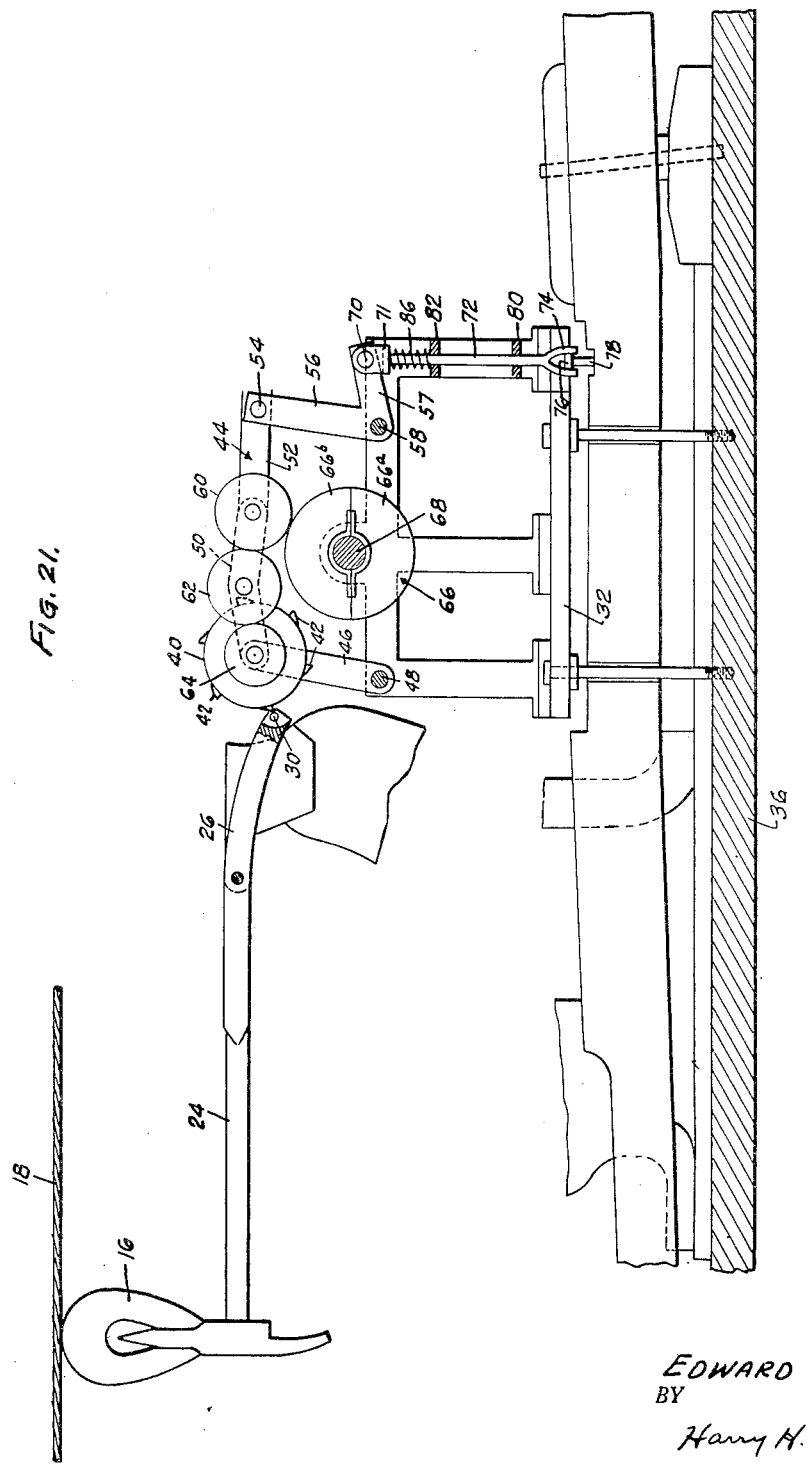
Fig. 21 is a fragmentary sectional view of the whippen wheel mechanism and piano hammer showing a changed position of the parts generally shown in Fig. 1.

In the embodiment of the invention which I have chosen to illustrate and describe the same, in Fig. 1 I have shown a grand piano action of a type which is familiar throughout the country and which may include the piano key 10 having the usual front key pin 12, balance key pin 14, and associated mechanism which is well known in the art, to provide means whenever the key is struck to whip the hammer 16 upwardly to strike the piano wires 18 to produce a sound. The usual damper wire 20 and damper head 22 are provided.

As previously described, with the paino action shown in Fig. 1 and which is well known in the art, as soon as the strings have been struck by the hammer 16, the same falls back into place and the tone gradually disappears.

In order to keep a sustaining action or continuous tone quality, I have provided means for causing the striking action of the hammer to be continuous when desired. For this purpose the pivoted hammer handle 24 has an extension 26 continuing from the pivot 28, the extension 26 carrying a roller 30 adjacent its end. I provide a base plate 32 which may be fastened by suitable bolts 34 to the piano key frame 36 at on end and to a support bracket 38 at the other end. The operating mechanism, as will presently be apparent, is generally mounted upon the base 32.

The actual striking of the roller 30 adjacent the end of extension 26 of the hammer handle 24 is accomplished by a continuously rotating whippen wheel 40 which has a plurality of teeth or dog members 42 projecting outwardly about its periphery, the whippen wheel being mounted in a rocker 44 which, when other mechanism is actuated, moves the counterclockwise rotating whippen wheel 40 into the path of the roller 30 at the end of the hammer handle 24. As will presently be described, the whippen wheel 40 is adapted to rotate in a range between approximately 240 and 360 R. P. M., so that with six dogs or teeth 42 as shown on the whippen wheel 40, the hammer will be actuated between 24 and 36 times per second, sufficient to cause the continuous striking action and have a prolonged unbroken tone. This is also due to the two-to-one ratio between the friction drive wheel (which rotates at between 120 and 180 R. P. M.), and the friction rollers which drive the whippen wheel.

Each whippen wheel 40 is mounted upon a rocker 44 which includes a link 46 pivoted upon a cross-rod 48 and a link 50 coupled with a link 52 pivotally connected at 54 to a bell crank lever 56 pivotally mounted upon a second cross-rod 58. Each rocker 44 has the friction rollers 60, 62 and 64 mounted thereon, the friction roller 64 being fastened to the whippen wheel 40. When the entire rocker is moved forward as shown in Fig. 21, the friction roller 60 will engage the periphery of a drive roller 66 mounted on a drive shaft 68. By means of this driving connection, a drive from the drive shaft 68 is transmitted to the whippen wheel 40 and the attendant continuous striking of the hammer lever is accomplished.

The short arm 57 of the bell crank lever 56 is pivotally connected by a pin 70 to a push rod 72 which has a fork 74 at the bottom end of the same connected by a pin or roller 76. Each of the keys within the melody range to which the fourth pedal attachment applies is provided with a raised cam-shaped ledge 78 which makes contact with the push rod and raises same to the position shown in Fig. 21 upon depression of the key 10. The push rod 72 is frictionally guided in the horizontal cross-bars or frame members 80 and 82 of the trundle carriage 84. Each of the push rods 72 has a return spring 86 fastened between its upper yoke 71 and the cross-bar 82 for returning the whippen wheel rocker 44 and associated parts to the normal position shown in Fig. 14. Each of the drive wheels 66 is preferably formed of two halves of fiber, 66a and 66b, having collar flanges to fasten the same together and at the same time fasten them on the drive shaft 68.

As previously mentioned, the whippen wheel rockers for each individual key and its associated hammer are mounted in a trundle carriage with the whippen wheels normally spaced to the left of the hammer extensions 26. The carriage, as best shown in Fig. 12, comprises the main drive shaft 68 and the frame members 80 and 82 connected together at their ends by upright bars 90 and 92, the cross-rods 48 and 58, and a pair of drag yokes 94 and 96 (see Fig. 15) which slidably support the trundle carriage. The frame members 80 and 82 and the cross-rods 48 and 58 each have a socket in the brackets 98, 100 and 102 rigidly fastened to the right end bracket 104 mounted on the base 32.

A compression spring 106 is provided in each of the sockets mentioned so that when the trundle carriage is moved to the right (see Fig. 12) by operation of the fourth pedal, upon release of the same the spring members 106 will act against the ends of the cross-rods 48 and 58 and the frame members 80 and 82 to return them to normal inoperative position. A medial support bracket 108 is provided on the base 32, the same having suitable openings through which the cross-rods 48 and 58 and the connecting rods 82a and 80a of the frame members may be slidably and supportably mounted. A similar forward support bracket 110 is provided, the same having similar openings for the slidable members described, as well as a forwardly extended neck portion 112 to provide a support for the forward end of the control rudder 114. The rods 48 and 58 extend through this bracket and are provided at their forward ends with shoulder members 116 which are adapted to be pushed forward during the operating action, as will be presently described.

From the foregoing it is believed to be clear that there are individual whippen wheels for each of the hammers in the area that is covered, individual whippen wheel rockers 44, bell crank levers 56, and push rods 72, each individually operated or directed by a cam 78 on the top of an individual key, each push rod being guided and carried in aligned openings 72a and 72b in the cross-frame members 82 and 80. The trundle carriage is disposed between the brackets 104 and 110 on the base plate 32, the carriage having the two yokes 94 and 96 which rigidly connect the parts of the same together so that the carriage moves as a unit to the right when the fourth pedal is depressed, and when pressure is released it returns to the left by reason of the compression springs 106 in the sockets 98, 100 and 102.

Referring now to the mechanism for motivating the shiftable trundle carriage and driving the shaft 68, said shaft being part and parcel of the carriage, this mechanism may generally comprise a tiny electric motor 118 which is mounted on a leftward extension of the key frame 36 and in a suitable housing 120 attached to the outside wall 122 of the piano. The motor, whose speed range is limited between 360 and 540 R. P. M., has a suitable manual switch (not shown) and a drive shaft 124 provided with a spiral driving gear 126 in mesh with a thrice enlarged fiber spiral driven gear 128 on the end of a stub shaft 130. The overall drive shaft will therefore rotate at a 3-to-1 diminished ratio from that of the motor, or at 120 to 180 R. P. M., as previously mentioned. As best shown in Fig. 17, the motor is preferably supported in a pair of brackets 132 and 134 mounted on the key frame 36 of the piano. Sound deadening and cushioning straps R are preferably provided both between the brackets and the key frame and the enclosing straps 138, so that any vibration or noise emitted by the motor may be deadened beyond disturbance.

I also provide a rheostat 142 on the side of the motor 118, the rudder control lever 144 carrying a spring wiper blade 146 which, as the rudder is moved forward, wipes across the same to increase the speed of the motor. Thus after a certain forward movement of the control rudder, the speed of the motor and of course of the driven shaft for the whippen wheels can be increased or decreased at the will of the operator, thereby controlling the speed of action of the whippen wheel and the volume of the tone.

The driven shaft 130 forms the coupling hub shaft of my improved clutch assembly and may be fastened by means of a screw member 131 to the driven gear 128. The coupling hub shaft may be formed with the rounded end portion 150 which has a square socket 152 axially thereof and a pair of stabilizer bars 154 and 156 extending therefrom. I provide a fiber coupling hub 158, a fiber spacer 160 and a clutch hub 162, also of fiber, for alignment therewith, the stabilizer bars being adapted to extend through suitable openings 159, 161 and 163 in the parts mentioned to keep them in axial alignment. The coupler hub 158 has a square stub shaft 164 adapted to extend into the opening 152 and be screw-threadedly fastened to the same, also in conjunction with the spacer 160, four bolts 151 are to run leftwardly through this combined unit, thus rigidly fastened together the coupling hub shaft and the coupling hub. The coupling hub in combination with the spacer is provided with peripheral straight splines 166 for driving engagement in a sliding connection in the interior bore 168 to the clutch collar 170. The clutch hub 162 is provided about its periphery with helical splines 172 for driving connection with a helical bore 174 in the forward portion of the clutch collar.

The forward end of the clutch hub 162 has an axial opening to receive a guide stem 176 of a driven clutch member, the coupling hub 158 having an enlarged axial bore 158a to receive the end of the same. The forward end of the clutch collar 170, having a helical bore, is thereon adapted when the clutch is moved forward, to engage a similar slip ring gear 182 on the face of the cup-shaped tractor flange 184, this latter formed in a single unit with the stem 176.

As the clutch collar 170 is moved forward across the straight splines of the coupling hub 158, and while thus carrying in tow the clutch hub 162, the latter being rigidly combined therewith through both the interconnection of helical splines and the slippage preventing stabilizer bars 154, 156, the tapered bore 186 of the clutch hub 162 engages a cup spring member 188 mounted on the shoulder member of the stem 176 to frictionally start rotation of the same. This continues until the forward end of the collar's helical bore, acting in fact as a gear, engages the complementary slip gear 182 and a joltless, easy engagement of these gears is made to effectively couple the main drive shaft 68 to the motor 118. The middle portion of the coupling hub shaft 130 has a pair of fiber retainer bearings 129 pinned thereto to be received in a split bearing mounting 127 which supports the same and at the same time prevents lateral or sidewise motion of the shaft during use.

The clutch operating mechanism will now be described. The control rudder 114, previously mentioned, is mounted for transverse or to and fro movement upon a pair of pin members 187 and 189 fastened to the brackets 140 and 110 respectively, the pins extended through elongated slots 200 and 202 adjacent the ends of the control rudder. The rudder is moved forward by an arcuately shaped operating lever 204 which is pivoted at 206 upon a bracket 208 that is mounted upon the base plate 32, the lever 204 having a pair of fork members 204a and 204b adjacent its upper end. Each of the forks carries a pin member 210 that engages between a pair of vertical walls 212 and 214, these corresponding to the rudder collar surrounding the approximate center of the control rudder 114.

The control rudder operating lever 204 extends forward from the pivot 206 and has an elongated slot 216 which receives a pin 218 carried at the top of the pedal column 220. The pedal column 220 may extend downwardly through the key frame 36 and the bottom cabinet wall or keybed 222 through a guide bracket 224 fastened to the bottom of the same. The lower end of the pedal column extends through an elongated slot 226 in the end of pedal lever 228. The pedal lever 228 is carried on a pivot 230 in the end of a bracket 232 connected to the bottom of the cabinet wall 222. A plurality of U-shaped brackets 234, 236 and 238 support the pedal lever in either extreme position and limit the movement of the same accordingly.

The forward end of the pedal lever may be suitably connected to a pedal link 240 which extends downwardly to the vicinity of the three usual pedals that are standard equipment upon pianos, i. e., the soft pedal, the damper pedal and the middle pedal. At this point it is connected to an operating pedal 242 mounted upon a pivot 244 so that upon depression of the pedal 242 the pedal lever is swung to the dotted line position shown in Fig. 16 against the resistance of a return spring 246 which is fastened to the bottom surface of the cabinet wall 222.

Upon depression of the fourth pedal 242, the control rudder operating lever is swung forward and moves the control rudder 114 forward, that is, to the right, in a straight line. The control rudder has a cam surface 248 adjacent its bottom wall which bears against, and hence pulls forward in a downward arc, a roller 250 carried in the upper end of the clutch operating fork 252. The clutch operating fork, as best shown in Figs. 3 and 13, which is mounted for pivotal action in brackets 254 on the base plate 32, also carries a pair of upright arms 256 which each carry a pair of rollers 258 extending laterally on both sides of the same.

The inner set of rollers is adapted to engage between the enlarged shoulders 170a on the clutch collar 170, and the outer sets of rollers are adapted to abut the shoulder members 116 at the forward ends of the rods 48 and 58. Thus, upon actuation of the fourth pedal, as previously described, the clutch collar 170 is moved forward to engage the clutch elements and the drive shaft 68. When this clutch engagement is completed, the collar 170 would then be at position flush against the circular periphery of the tractor flange 184 while the outer rollers 258 would similarly coincide with the top surface of the shoulder members 116 of the cross-rods 48 and 58. The continuous and automatic further depression of the pedal would thereupon cause the collar 170 to bear against the tractor flange 184, also the outer rollers against the shoulder members of the cross-rods, thus causing the trundle carriage to shift to the right, bringing it in performance alignment with the selected range of hammers.

Thus, by depressing the fourth pedal 242, the entire mechanism is actuated and continues to operate until the foot pedal is released. In this condition, any key that is struck within the range mentioned and which has one of the cam surfaces 78 thereon, will throw into operation the whippen wheel 40 and associated parts connected with its particular hammer, so that a continuous tone operation is applied to the particular strings of the key which is struck. As previously mentioned, the driven shaft 68, due to the rheostat associated with the motor and the wiper arm connected to the rudder control, can be driven at a speed which can be controlled to increase the same by depressing the pedal 242 to its full extent. In the event it is not desired to have quite as loud a tone, the pedal is not depressed to its full extent.

In explanation of the foregoing, the cam under-surface 248 of the control rudder is shaped of such degree and length as to achieve within its pulling influence upon the clutch operating fork 252 the combined process of clutching the main drive shaft 68 and the shifting of the full trundle carriage. At the end of that double process, the roller 250 carried atop the operating fork, would be at position along the flat under-surface of the rudder to the left of the cam. In continuing the depression of the pedal, the rudder would move forward, riding over the roller 250, while securely holding the operating fork 252 in its inclined clutching position. Thus it can be seen that during the process of tonal volume enlargement or diminishment, the control rudder, maintaining continuous contact with the motor accelerating rheostat 142, would travel over and across the roller 250, riding thereupon at position of its flat under-surface, to the left of the cam. It may also be noted that this process of volume modulation will take effect along the bottom half of the pedal range of depression.

Immediately upon release of the pedal 242, the trundle carriage 84 will move to the left, carrying all of the whippen wheels out of alignment with the hammer extensions, due to the action of the compression springs in the sockets 98, 100 and 102. The control rudder 114 will of course be returned to the position shown in Fig. 3, due to the action of return spring 246 on the pedal lever 228. The engagement of the roller 250 against the cam surface 248 on the rudder will carry the roller and clutch operating fork back to the normal inoperative position shown in Fig. 3, with the roller resting against the shoulder 249, moving the clutch by means of the inner set of rollers 258 spaced between the clutch collar shoulders 170a.

All of the support brackets, as well as the mounting of the base plate 32, may be provided with resilient pads at their fastenings for sound deadening, elimination of vibration and to generally assist in prolonging the life of the movable parts of the mechanism.

Due to the complete operating mechanism, one for each key, it can be seen that should any one become broken or out of order it is a simple matter to replace the individual mechanism without in any way affecting any of the others.

From the above and foregoing description it can be seen that I have provided a carefully designed and accurately operating mechanism for securing a prolonged or sustained operation of any key which may be depressed during the playing of the piano. As previously explained, when the key is depressed and it is desired to hold or prolong the tone of the same, the fourth pedal is also depressed, which brings into operation by means of the operation of the pedal lever and pedal column, the actuation of the clutch mechanism and the movement of the trundle carriage, so that a whippen wheel is provided to continuously operate upon the extension of the particular hammer for that key during the length of time that the key is depressed and the fourth pedal is depressed.

While I have illustrated and described a preferred embodiment of the invention, it will be apparent to those skilled in the art that changes and modifications may be made in the exact details shown, and I do not wish to be limited in any particular; rather what I desire to secure and protect by Letters Patent of the United States is:

1. The combination with a piano of a pedal mechanism for actuation of individual hammers associated with individual keys to effect a continuous tone when desired, said mechanism including a rotatable whippen wheel for each key, means associated with each key for moving a whippen wheel into operative engagement with its individual hammer, and means for rotating said whippen wheels, all of said means controlled by depressing said fourth pedal.

2. The combination with a piano of a pedal mechanism for actuation of individual hammers associated with individual keys to effect a continuous tone when desired, said mechanism including a rotatable whippen wheel for each key, means associated with each key for moving a whippen wheel into operative engagement with its individual hammer, and means for rotating said whippen wheels, all of said means controlled by depressing said fourth pedal, said last named means including a variable speed motor.

3. The combination with a piano of a pedal for actuation of individual hammers associated with individual keys in a continuous manner when desired, a clutch mechanism, said pedal capable of operating said clutch mechanism when depressed, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel.

4. The combination with a piano of a pedal for actuation of individual hammers associated with individual keys in a continuous manner when desired, a clutch mechanism, said pedal capable of operating said clutch mechanism when depressed, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel, said means including a pivoted rocker for each whippen wheel and a cam-shaped ledge on each key for raising said rocker.

5. The combination with a piano of a pedal for actuation of individual hammers associated with individual keys in a continuous manner when desired, a clutch mechanism, said pedal capable of operating said clutch mechanism when depressed, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel, said means including a pivoted rocker for each whippen wheel and a cam-shaped ledge on each key for raising said rocker, said pivoted rocker mounted on said trundle carriage.

6. The combination with a piano of a pedal for actuation of individual hammers associated with individual keys in a continuous manner when desired, a clutch mechanism, said pedal capable of operating said clutch mechanism when depressed, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel, said means including a pivoted rocker for each whippen wheel and a cam-shaped ledge on each key for raising said rocker, said pivoted rocker mounted on said trundle carriage and the speed of said motor controlled by said fourth pedal.

7. The combination with a piano of a pedal for actuation of individual hammers associated with individual keys in a continuous manner when desired, a clutch mechanism, said pedal capable of operating said clutch mechanism when depressed, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel, the extent of depression of said pedal controlling the speed of said motor.

8. The combination with a piano of a pedal for actuation of individual hammers associated with individual keys in a continuous manner when desired, a clutch mechanism, a control rudder therefor, said pedal capable of operating said control rudder, a variable speed motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel.

9. The combination with a piano of a pedal for actuation of individual hammers associated with individual keys in a continuous manner when desired, a clutch mechanism, a control rudder therefor, said pedal capable of operating said control rudder, a variable speed motor, a shaft, said clutch mechanism connected between said motor and said shaft, said shaft having a plurality of spaced friction drive wheels thereon, one for each key, a trundle carriage capable of limited lateral movement by operation of said pedal, said trundle carriage mounted above the piano keys, a plurality of whippen wheels mounted on said carriage, one for each key, and means associated with a key when depressed for making a driving engagement between a friction drive wheel and its associated whippen wheel.

10. The combination with a piano of a pedal for actuation of individual hammers associated with individual keys in a continuous manner when desired, a clutch mechanism, said pedal capable of operating said clutch mechanism when depressed, a motor, a shaft, said clutch mechanism connected between said motor and said shaft, said shaft having a plurality of spaced friction drive wheels thereon, one for each key, a trundle carriage capable of limited lateral movement by operation of said pedal, a plurality of whippen wheels mounted on said carriage, one for each key, and means associated with a key when depressed for making a driving engagement between a friction drive wheel and its associated whippen wheel, said means including a pivoted rocker, a push rod for moving the same and a cam-shaped ledge on each key for raising a push rod when the key is depressed.

References Cited in the file of this patent

UNITED STATES PATENTS

| 913,990 | Soblik | Mar. 2, 1909 |
| 1,639,241 | Veaco | June 24, 1925 |
| 2,037,312 | Canatsey | Apr. 14, 1936 |

FOREIGN PATENTS

| 48,654 | Germany | Dec. 25, 1888 |
| 388,060 | Great Britain | Feb. 13, 1933 |